Figure 1:
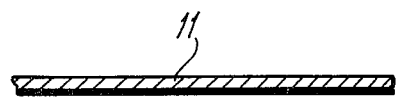

Oct. 5, 1965 D. L. KUMMER ETAL 3,210,233
HEAT INSULATING AND ABLATIVE STRUCTURE AND METHOD OF MAKING SAME
Filed Aug. 27, 1962

INVENTORS
DONALD L. KUMMER
MARVIN S. HOCHBERG
BY Gravely, Lieder & Woodruff
ATTORNEYS 3,210,233
HEAT INSULATING AND ABLATIVE STRUCTURE
AND METHOD OF MAKING SAME
Donald L. Kummer, Florissant, and Marvin S. Hochberg, Creve Coeur, Mo., assignors to McDonnell Aircraft Corporation, St. Louis County, Mo., a corporation of Maryland
Filed Aug. 27, 1962, Ser. No. 219,591
6 Claims. (Cl. 161—68)

The present invention relates to a heat insulating and ablative material and specifically relates to a structure comprising a non-metallic honeycomb having a heat insulating and ablative material filled into the cells thereof.

In a re-entry heat shield or heat dissipating structure, some of the desirable characteristics include the following:

(a) High surface temperature to reduce heat input to the surface of the material, and to increase the amount of heat dissipated by re-radiation, sensible heat and latent heat.

(b) High surface emissivity to increase the amount of heat dissipated by re-radiation.

(c) Large volumes of gas produced on decomposition to thicken the boundary layer and thus reduce heat input from the boundary layer to the ablating surface.

(d) Large endothermic reactions should occur to dissipate heat by chemical reaction.

(e) Low thermal conductivity to reduce heat transfer to the back side structure.

(f) High specific heat to reduce heat transfer to the back side structure and to dissipate heat by storage.

(g) A smooth and uniformly receding surface to improve aerodynamic and heat transfer properties.

(h) A low density so that a greater thickness of ablative material is available for a given reentry condition which reduces back side structural heating.

(i) A low "Z" number to reduce secondary radiation effects.

Since many of the materials which provide the foregoing qualities in the highest degree have little structural integrity, functional characteristics have heretofore had to be sacrificed for structural strength.

In the present invention, a non-metallic honeycomb structure is secured to a substrate or back side structure and materials having optimum heat dissipating properties are filled into the honeycomb. The honeycomb provides structural integrity for the heat dissipating materials, even though they may be brittle, mechanically weak or of very low density.

The honeycomb gives support to the heat dissipating materials during on site handling, during blast-off, and in fact, at all times prior to and during re-entry.

The honeycomb also provides support for the heat dissipating material during re-entry. It maintains the material on the heat shield so that it heats to a higher temperature rather than eroding away. The filler or ablative material has a high coefficient of expansion but little elasticity. The honeycomb breaks up the surface and the expanding ablative material can grow only in one direction in the cell and the honeycomb counteracts the tendency of the material to expand in a direction parallel to the structure.

The honeycomb also supports the char layer that is formed. Formation and retention of a good char layer is very important and influences all of the foregoing listed primary requirements for an ablative material.

The honeycomb also increases the surface smoothness of the material.

The structure of the present invention is useful as a heat shield for re-entry space vehicles, and also may be used as interior wall surfaces for blast furnaces and the like.

One of the principal objects of the present invention is to provide a heat insulating and ablative structure which, when exposed to extreme re-entry heat, ablates uniformly with a smooth surface and maintains its structural integrity.

Another object of the present invention is to provide a structure for application to space, planetary and interplanetary vehicles which provides protection of the vehicle and personnel against the effects of corpuscular radiation and aerodynamic heating.

Still another object of the present invention is to provide a heat insulating and ablative structure wherein a non-metallic honeycomb matrix is filled with organic or inorganic materials, or organic-inorganic composites to provide shielding against heat and corpuscular radiation.

Another object of the present invention is to provide a method of applying a heat insulating and ablative structure to a substrate wherein honeycomb material, having open ended cells, is positioned directly onto the substrate and bonded thereto, with the cells being filled with a heat insulating and ablative material which itself has little structural integrity, but which has excellent insulating and ablative properties.

A further object is to provide a structure, which in addition to having heat insulating and ablative properties, provides little secondary radiation when struck by high energy particles.

These and other objects and advantages will become apparent hereinafter.

The present invention comprises a thermal insulating and ablative structure including a non-metallic honeycomb matrix having an insulating and ablative material filled into cells of said honeycomb. The present invention further comprises the structure hereinafter described and claimed and the method of making said structure.

Figure 2:
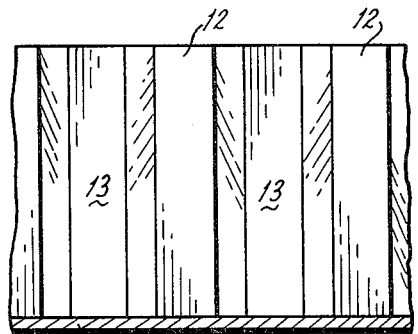
Figure 3:
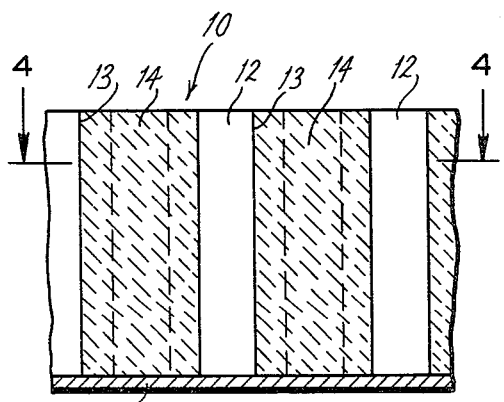
Figure 4:
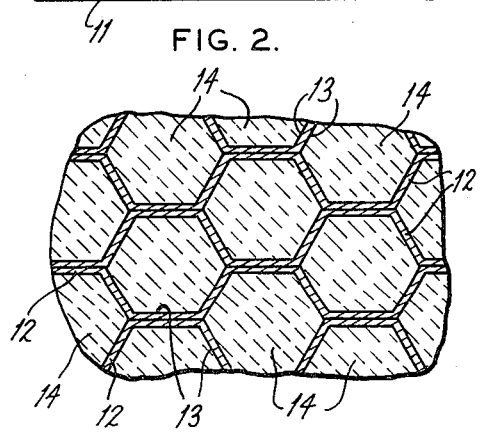
Figure 5:
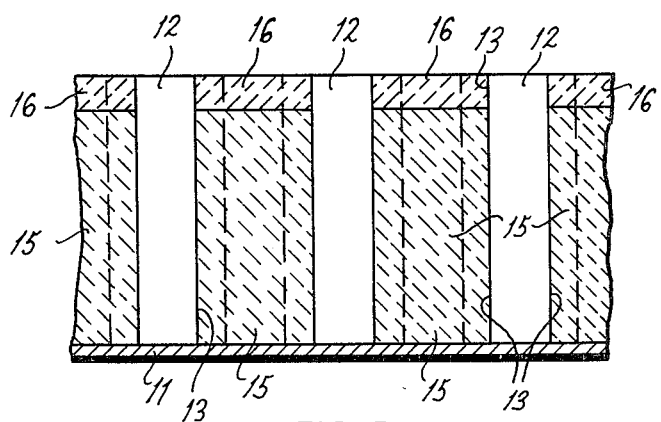

In the drawings, wherein like numbers refer to like parts wherever they occur:

FIG. 1 shows a fragmentary section of a substrate prior to application of the heat insulating and ablative material, FIG. 2 is a side sectional view showing honeycomb positioned on the substrate, FIG. 3 is a view similar to FIG. 2 and shows the cells of the honeycomb filled with a heat insulating and ablative material, FIG. 4 is a sectional view taken along line 4—4 in FIG. 3, and FIG. 5 is a side sectional view similar to FIG. 3, but showing a modified form of the invention.

As shown in the drawings, the structure 10 of the present invention is applied to a substrate 11 by positioning a non-metallic honeycomb matrix 12 having open ended cells 13 directly onto the substrate 11 with the vertical axis of the cells 13 being perpendicular to the substrate 11. The honeycomb 12 is bonded to the substrate 11 by a suitable adhesive, or the heat insulating and ablative material 14 which is filled directly into the cells 13 of the honeycomb 12 may act as an adhesive to secure both itself and the honeycomb 12 to the substrate 11. The heat insulating and ablative material 14 becomes the leading surface of the vehicle during re-entry and receives reentry heat directly.

The non-metallic honeycomb is composed of a reinforcement and a binder. The reinforcement is preferably glass fibers (both conventional woven "E" glass and woven, high silica leached "E" glass), and may also be made of woven quartz, woven nylon, asbestos, woven carbon, woven graphite, and the like. The binder of the non-metallic honeycomb is preferably a strong char forming organic resin, such as temperature resistant phenolic, epoxy, silicone, and the like.

The heat insulating and ablative material which is filled into the cells of the honeycomb may be organic, inorganic or organic-inorganic composites. These materials are of relatively low cost and are available commercially. They may be in the form of dispersions, sols, liquids, solutions, dry powders, short-length fibers or spheres which may be readily mixed, dispersed or blended into composites. The materials or composites are readily processed into the honeycomb matrix by direct filling with or without heat and pressure augmentation. The factors of reproducibility and reliability are of high orders of magnitude.

The organic, inorganic and organic-inorganic composites must have low thermal conductivity, high specific heat, high surface temperature capability, high surface emissivity, low density, produce large volumes of gas, have large endothermic reactions and produce smooth or uniformly receding surface. Other desirable characteristics include low coefficients of expansion, high latent heats, produce vapors which are opaque to thermal radiation from the boundary layer, and low atomic numbers.

Suitable organic materials include: paraffin, polyethylene, polypropylene, polycarbonate, phenolic and phenolic microballoons, epoxy, silicone, nylon, fluoroethylene, acrylic and melamine and combinations of the foregoing.

Suitable inorganic materials include the following: fused silica (silicon dioxide) in the form of fibers of varying degrees of purity, granules, sols or hollow-spheres, magnesium oxide, zirconium oxide, alumina-silicate fibers, fibrous potassium titanate, carbon fiber, graphite fibers and combinations of the foregoing.

Combinations of the foregoing organic and inorganic materials also may be used depending on the precise re-entry conditions which may be encountered.

If protection from corpuscular radiation is essential (such as for interplanetary vehicles passing through radiation belts), a material having a low "Z" number but also having heat insulating and ablative qualities may be mixed or layered into the honeycomb. These materials have low molecular weights, such a paraffin, phenolic, and polyethylene.

The "Z" number of a material is equal to its atomic number and among other things describes its relative ability to emit electromagnetic radiation known as bremsstrahlung (braking or secondary radiation) when a high energy particle passes through the material. The larger the "Z" number of a material, the greater the bremsstrahlung. Since the bremsstrahlung produced may be as or more serious a radiation hazard than the original or primary particle, low "Z" number materials are desirable so that additional shielding is not required.

As will be recognized, many of the foregoing listed materials have little structural integrity and therefore the use of a non-metallic honeycomb matrix allows extremely efficient heat insulating and ablative materials to be used. If the honeycomb were not present, the material would have to withstand the re-entry effects by itself, and the desired heat insulating and ablative characteristics would have to be sacrificed for structural strength. The use of the non-metallic honeycomb also provides an increase in strength to the material to resist assembly, launch site, launch and orbital loads. The additional structural integrity provides an increase in functional effectiveness as a corpuscular radiation shield. This is particularly important since many of the optimum heat dissipating materials are brittle, mechanically weak and have very low density. The honeycomb also supports the char layer that is formed on re-entry. Formation and retention of a good char layer during re-entry is very important and greatly influences all of the primary requirements for an ablative material. The char is of varying strength depending upon the material filled into the honeycomb. In addition to heat, re-entry conditions induce high surface shearing stresses, sonic and vibration levels. The use of a non-metallic honeycomb as a matrix provides structural integrity to this char preventing large area spalling during re-entry. The structural integrity of the shielding material allows for more efficient use of the structure.

The use of the honeycomb also greatly increases surface smoothness and aerodynamic properties of the re-entry surface. Although the filler material dissipates the heat, the honeycomb greatly influences the physical characteristics of the composite. For example, when a suitable material is exposed to re-entry conditions without the honeycomb matrix, the surface became greatly bubbled, distored and exhibits unsatisfactory aerodynamic characteristics after about four minutes. The same material when filled into a honeycomb matrix maintained its integrity, and had excellent aerodynamic characteristics even after fifteen minutes of exposure to re-entry conditions.

As compared to a metal honeycomb, the non-metallic honeycomb has lower thermal conductivity, better ablation characteristics, lighter weight, and better temperature resistance.

Since the present structure has no outer covering member and is not a sandwich type structure, the weight is greatly reduced which is extremely important in space type vehicles.

The honeycomb may be filled with the heat insulating and ablative material and the structure bonded onto a substrate using a suitable bonding agent if desired. Also, the honeycomb may be bonded to the substrate and filled with the filler, or the filler may be utilized as a binder to secure the entire structure to the substrate.

The following example gives a preferred specific embodiment of the present invention.

*Example No. 1—Dry phenolic powder*

The attachment surface of the primary structure is appropriately treated to make it receptive to a bonding operation using a structural adhesive formulated of organic resins and modifiers. This adhesive may be in the form of a paste, powder, solvent solution or dispersion, unsupported film or supported film. The surface preparation consists of removing all surface contamination by either physical or chemical means. The adhesive is applied to the treated surface of the primary structure and the non-metallic honeycomb is placed on the adhesive. Pressure is applied to this assembly after which the entire assembly is exposed to heat for a specified period of time. This application of pressure, temperature and time effects a cure (completion of polymerization) of the adhesive and a structural composite results. The adhesive preferably comprises epoxy resins, phenolic resins, and fillers and the bonding temperature and pressure preferably are 350° F. and 15 p.s.i., respectively.

The non-metallic honeycomb is now ready for the incorporation of a dry phenolic powder. The structural composite (primary structure to which the non-metallic honeycomb has been attached) is positioned in a chamber or other enclosure which can be evacuated. The chamber or enclosure is positioned upon a high frequency, low amplitude vibratory table. The chamber or enclosure contains the necessary fittings for evacuation, a closed hopper and a feed control gate. The weighed amount of phenolic powder is placed in the hopper and the hopper closed. The chamber or enclosure is evacuated, the vibratory table started in operation and the hopper feed control gate is opened allowing the phenolic powder to enter the evacuated chamber and flow, assisted by the vibration, into the cells of the non-metallic honeycomb. After all the phenolic powder has been introduced, the vibratory table and chamber evacuation is stopped. The vibratory table is replaced by a heat source (steam, oil or electric).

A porous, air-permeable ram of low thermal conductivity is positioned on top of the phenolic powder filled non-metallic honeycomb. This ram is used to apply pressure to the material as it is being transformed from a powder to a liquid to its final hard, rigid cured state. The heat source is activated and heat is gradually applied from the underside of the structure until a temperature of 160–200° F. is obtained uniformly through the phenolic powder. During the attainment of this temperature, pressure is being gradually applied through the downward action of the ram until the maximum pressure of 200 p.s.i. is reached. The temperature of the phenolic powder is then allowed to rise very slowly at a rate not to exceed 5° F. per minute until a uniform temperature of 325–350° F. is obtained. This temperature is maintained for a minimum of one hour. The heat source is then turned off, the entire structure allowed to cool to 150° F. or less under pressure. After the pressure is removed, the part is complete.

In the discussion and examples which follow, the attachment of the non-metallic honeycomb to the primary structure is the same as described for Example No. 1. The method used to incorporate the organic or inorganic material or organic-inorganic composites will vary with the physical state (solid or liquid) of the material. The method described is applicable to dry phenolic and melamine powders and formulations of dry phenolic powder modified with selected fillers, such as phenolic microballoons, and inorganic fibers, granules or hollow spheres. Dry phenolic powders also may be modified with other resins, such as nylon or polyamide, and the process detailed above for dry phenolic powder is applicable.

Solid materials such as paraffin, polyethylene, polypropylene, fluoroethylene, nylon or polyamide and polycarbonate can be incorporated in a fashion similar to that used for the dry phenolic powder. The form of these solids is usually 1/16" cubes or small rods 1/16"–1/8" in diameter by 1/8" long. Softening temperatures will vary with the material used and can range from 120° F. to 600° F. Pressure may range from 15 p.s.i. to 1000 p.s.i. Dwell time at pressure and temperature is of short duration; usually several minutes is all that is required.

Paste materials such as silicone rubber or formulated compounds based on solutions or dispersions of silicone, epoxy, phenolic, melamine or acrylic and modified with appropriate fillers are incorporated in a manner similar to that used for dry powders, but with techniques modified for the pasty state of the material. The formulation is blended and the air is removed by passing the material through a chamber maintained at less than atmospheric pressure. Using equipment similar to that described in Example No. 1, except for the vibrating table, the material is incorporated into the non-metallic honeycomb. Where necessary, heat is applied to effect a cure, or completion of polymerization, of the material; with this type of material. There is generally no requirement for causing the heat to be introduced from the underside. Pasty materials can also be incorporated into the non-metallic honeycomb by means of a caulking gun or similar device.

Formulations which are more fluid in nature, and formulated with the same materials as used in the paste compositions can be incorporated into the non-metallic honeycomb by direct pouring. A de-airing step, after incorporation into the honeycomb, may be indicated depending upon the viscosity of the formulated material.

*Example No. 2—Fused silica composite*

A non-metallic honeycomb is bonded to a substrate with a high temperature resistant adhesive as in Example No. 1.

Fused silica grain of proper size distribution is mixed with a colloidal silica slurry consisting of approximately 30% solids in water until a workable paste is obtained. A major quantity of entrapped air is removed from the paste by stirring, while a reduced pressure is maintained over the paste. Any other conventional methods of de-airing may be used.

The de-aired paste is placed into the honeycomb in such a manner so as not to trap air. This may be accomplished by placing a vacuum tight tool over the honeycomb in such a manner that a cavity is formed which will enable evacuation of the honeycomb and injection of the fused silica paste. When the cavity is evacuated, the paste is injected into the honeycomb containing cavity with any type if piston-cylinder device.

After the cavity is filled with the paste, the material is allowed to set. The tool or mold then is removed and the material is baked at approximately 200° F.

The dried and cured material may be further strengthened and hardened by impregnation of the composite with the colloidal silica followed by drying at approximately 200° F. Several impregnations may be utilized.

The surface may be machined, ground or sanded to the desired geometry.

*Example No. 3—Layering technique*

FIG. 5 shows the honeycomb 12 bonded to a substrate 11 with a high temperature resistant adhesive as in Examples Nos. 1 and 2.

A low density, temperature resistant material 15 with a very low thermal conductivity such as zirconia fibers, alumino-silicate fibers (Fiberfrax), finely divided silica, etc., is placed into the honeycomb cells 13. The cells 13 may be filled to within approximately 1/8" of the surface.

The ablative material 16 (silica, phenolic, silicones, nylon, etc.) is applied as in Examples Nos. 1 and 2, however, only a relatively thin surface covering layer may be utilized over the insulating layer 15.

If desired, a layer of a material having a low "Z" number can be incorporated into any of the foregoing examples. The low "Z" number material also can be mixed throughout the heat shield filler.

Although many adhesives may be used for bonding the filled or unfilled honeycomb to the substrate, the preferred adhesive is a supported film adhesive bearing the commercial designation of HT424 and manufactured by Bloomingdale Rubber Co., Aberdeen, Maryland. This adhesive is based on epoxy and phenolic resins and contains a series of fillers to provide the heat resistance and strength necessary for a structural adhesive. The basic ingredients of the adhesive are mixed and blended together and the mixture is then calendered on a woven glass fabric to a given thickness and a given weight of material per square foot.

This invention is intended to cover all changes and modifications of the examples of the invention herein chosen for purposes of the disclosure, which do not constitute departures from the spirit and scope of the invention.

What is claimed is:

1. A thermal insulating and ablative heat shield structure for re-entry space vehicles comprising a rigid substrate, a rigid non-metallic honeycomb matrix bonded to the substrate and a heat insulating and ablative material positioned in the cells of the honeycomb, the honeycomb cells being open to a heat receiving surface and the cell end walls and said ablative material receiving re-entry heat directly, said cells holding the ablative material and maintaining it in substantially its original shape while it is charred during the heat of re-entry and retaining the char layer formed on the outer surface of the heat shield during re-entry.

2. The structure defined in claim 1 wherein said ablative material has a high surface temperature, high surface emissivity, produces large volumes of gas, has large endothermic reactions, low thermal conductivity, high specific heat, low density, and forms a smooth uniformly receding surface on ablating.

3. The structure defined in claim 1 including a material of low Z number positioned in the cells of the honeycomb.

4. The structure defined in claim 1 wherein said honeycomb is a material selected from the group consisting of glass fibers, quartz, asbestos, nylon, ceramic fibers, graphite fibers, carbon fibers and combinations thereof.

5. The structure defined in claim 4 wherein the heat insulating and ablative material is selected from the group consisting of paraffin, polyethylene, polypropylene, polyurethane, polycarbonate, phenolic and phenolic microballoons, epoxy, silicone, nylon, fluoroethylene, acrylic, melamine, silica fibers, hollow spheres and grains, magnesium oxide, zirconium oxide, alumina-silicate fibers, fibrous potassium titanate, carbon fibers, graphite fibers and combinations thereof.

6. A thermal insulating and ablative heat shield structure for re-entry space vehicles comprising a rigid substrate, a rigid non-metallic honeycomb matrix positioned on said substrate and bonded thereto with the open ends of the cells outwardly, a layer of low density, temperature resistant materials having low thermal conductivity positioned within the honeycomb cells adjacent to the substrate, and a covering layer of ablative material positioned on top of the temperature resistant material and within the honeycomb cells.

References Cited by the Examiner

UNITED STATES PATENTS

| | | | |
|---|---|---|---|
| 2,061,569 | 11/36 | Fischer | 161—122 X |
| 2,744,042 | 5/56 | Pace. | |
| 2,837,779 | 6/58 | Jacobs. | |
| 2,903,389 | 9/59 | Fujita. | |

FOREIGN PATENTS 213,242  7/57  Australia.

EARL M. BERGERT, *Primary Examiner.*

MORRIS SUSSMAN, CHARLES D. QUARFORTH,
*Examiners.*